(12) United States Patent
Ahn et al.

(10) Patent No.: US 11,893,916 B2
(45) Date of Patent: Feb. 6, 2024

(54) METHOD FOR MEASURING TEMPERATURE IN INTEGRATED CIRCUIT, INTEGRATED CIRCUIT HAVING TEMPERATURE SENSOR, AND DISPLAY DEVICE

(71) Applicant: LX Semicon Co., Ltd., Daejeon (KR)

(72) Inventors: Yong Sung Ahn, Daejeon (KR); Hyo Joong Kim, Daejeon (KR); Jae Sik Cho, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/964,640

(22) Filed: Oct. 12, 2022

(65) Prior Publication Data
US 2023/0120028 A1   Apr. 20, 2023

(30) Foreign Application Priority Data

Oct. 20, 2021 (KR) .................. 10-2021-0140521
Jun. 29, 2022 (KR) .................. 10-2022-0079599

(51) Int. Cl.
*G09G 3/00* (2006.01)
*G01K 7/16* (2006.01)

(52) U.S. Cl.
CPC ............... *G09G 3/006* (2013.01); *G01K 7/16* (2013.01); *G01K 2217/00* (2013.01); *G09G 2330/045* (2013.01); *G09G 2330/12* (2013.01)

(58) Field of Classification Search
CPC ............. G09G 3/006; G09G 2320/044; G09G 2330/12; G09G 2330/045; G09G 2320/041; G01K 7/16; G01K 2217/00
See application file for complete search history.

(56) References Cited

U.S. PATENT DOCUMENTS

| | | |
|---|---|---|
| 7,891,869 B2 | 2/2011 | Takeuchi |
| 9,483,034 B2 | 11/2016 | Soenen et al. |
| 11,335,274 B2 | 5/2022 | Lee et al. |
| 2016/0149574 A1* | 5/2016 | Cui ................. H03K 19/00369 327/513 |
| 2021/0082352 A1* | 3/2021 | Lee ...................... G01K 15/005 |

* cited by examiner

*Primary Examiner* — Hang Lin
(74) *Attorney, Agent, or Firm* — ROTHWELL, FIGG, ERNST & MANBECK, P.C.

(57) ABSTRACT

An embodiment relates to a method of measuring an ambient temperature by using a temperature sensor provided in an integrated circuit (IC) and a measurement error of a temperature sensor may be improved by correcting an output value of a temperature sensor by using a correction value stored in a memory.

18 Claims, 13 Drawing Sheets

METHOD FOR MEASURING TEMPERATURE IN INTEGRATED CIRCUIT, INTEGRATED CIRCUIT HAVING TEMPERATURE SENSOR, AND DISPLAY DEVICE

CROSS REFERENCE TO RELATED APPLICATION

This application claims priority to Republic of Korea Patent Application Nos. 10-2021-0140521 filed on Oct. 20, 2021, and 10-2022-0079599 filed on Jun. 29, 2022, which are hereby incorporated by reference in their entirety.

BACKGROUND

1. Field of Technology

The present disclosure relates to a method for measuring a temperature in an integrated circuit, an integrated circuit having a temperature sensor, and a display device.

2. Related Technology

Temperature sensors, as sensors that detect ambient heat, have been widely used in semiconductor integrated circuits. For example, in a display device, a temperature sensor may sense the temperature of a heat-sensitive component. A panel driving device (e.g., a data driving circuit or a source driver) may appropriately control a voltage or current supplied to a component based on the sensed temperature.

The temperature sensor may measure temperature by using electrical characteristics that change according to heat. The temperature sensor may output a current, voltage, or an electrical signal corresponding thereto, which varies according to temperature, and measure or estimate temperature from the output electrical signal. For example, a temperature sensor built in an integrated circuit may measure or estimate the temperature by sensing a change in resistance according to a change in temperature or a change according to temperature characteristics of a semiconductor device (e.g., a bipolar junction transistor (BJT) or a diode).

An error may occur between an estimated temperature estimated based on data obtained from the signal output from the temperature sensor and an actual temperature (e.g., external temperature or ambient temperature). In order to correct the error, temperature data may be corrected in an analog stage. This method has a disadvantage in that it requires a complex circuit for error correction of temperature data.

The temperature sensor may cause an error due to various factors. For example, a voltage output from the temperature sensor may vary due to a change in a ground voltage of the temperature sensor. As another example, when an integrated circuit having a temperature sensor (e.g., a source driver of a display device) performs an operation that consumes a lot of power, an internal temperature (e.g., a junction temperature) of the integrated circuit may be increased to be higher than an actual temperature (e.g., external temperature or ambient temperature), and in this case, the temperature sensor provided inside the integrated circuit may measure or estimate a temperature to be different from an actual temperature.

Accordingly, in order to accurately measure the temperature, it may be necessary to correct the junction temperature of the integrated circuit based on the ambient temperature, as well as trimming deviations between the integrated circuits. Meanwhile, when the integrated circuit is mounted on a module (e.g., a display module) and operated, there may be a change in the junction temperature in the temperature sensor according to a change in current flowing in the integrated circuit or the amount of power consumed in the integrated circuit. In this case, when the ambient temperature is measured using the temperature sensor included in the integrated circuit, an error may occur.

Therefore, it is necessary to develop a temperature sensor correction technology capable of solving the error correction problem of the temperature sensor and compensating for an error occurring according to power consumption of the integrated circuit including the temperature sensor.

The discussions in this section are only to provide background information and does not constitute an admission of prior art.

SUMMARY

An aspect of the present embodiment is to provide an integrated circuit having a temperature sensor and a method for measuring a temperature in the integrated circuit, which correct a temperature measured to be different depending on the amount of power consumed in the integrated circuit including a temperature sensor.

Another aspect of the present embodiment is to provide a display device that corrects an error of a measured temperature based on the amount of power consumed according to a display pattern in a data driving circuit (e.g., a source driver) including a temperature sensor.

An embodiment provides a method for measuring a temperature including: sensing a signal corresponding to a temperature by a temperature sensor included in an integrated circuit; identifying the amount of power consumed according to an operation of the integrated circuit; generating a correction value corresponding to the identified amount of power; and generating an estimate value of an ambient temperature based on the correction value and the signal sensed by the temperature sensor.

Another embodiment provides an integrated circuit including: a temperature sensor configured to sense a signal corresponding to a temperature; a correction value generating circuit configured to identify an amount of power consumed according to an operation of the integrated circuit and generate a correction value corresponding to the amount of power; and a data correction circuit configured to generate an estimate value of an ambient temperature based on the correction value generated by the correction value generating circuit and the signal sensed by the temperature sensor.

Another embodiment provides a display device including a data driving circuit configured to generate a data voltage corresponding to a grayscale value of each pixel; and a panel including a plurality of pixels arranged therein and causing the plurality of pixels to emit light based on the data voltage received from the data driving circuit, wherein the data driving circuit includes: a temperature sensor configured to sense a signal corresponding to a temperature; a correction value generating circuit configured to identify an amount of power consumed according to an operation of the data driving circuit and to generate a correction value corresponding to the amount of power; and a data correction circuit configured to generate an estimate value of an ambient temperature based on the correction value generated by the correction value generating circuit and the signal sensed by the temperature sensor.

As described above, according to the present embodiment, a temperature sensing error caused by power consumption of an integrated circuit may be improved. Also, according to the present embodiment, a measurement error of a panel temperature measured by a source driver may be improved.

DETAILED DESCRIPTION OF EMBODIMENTS

Figure 1:
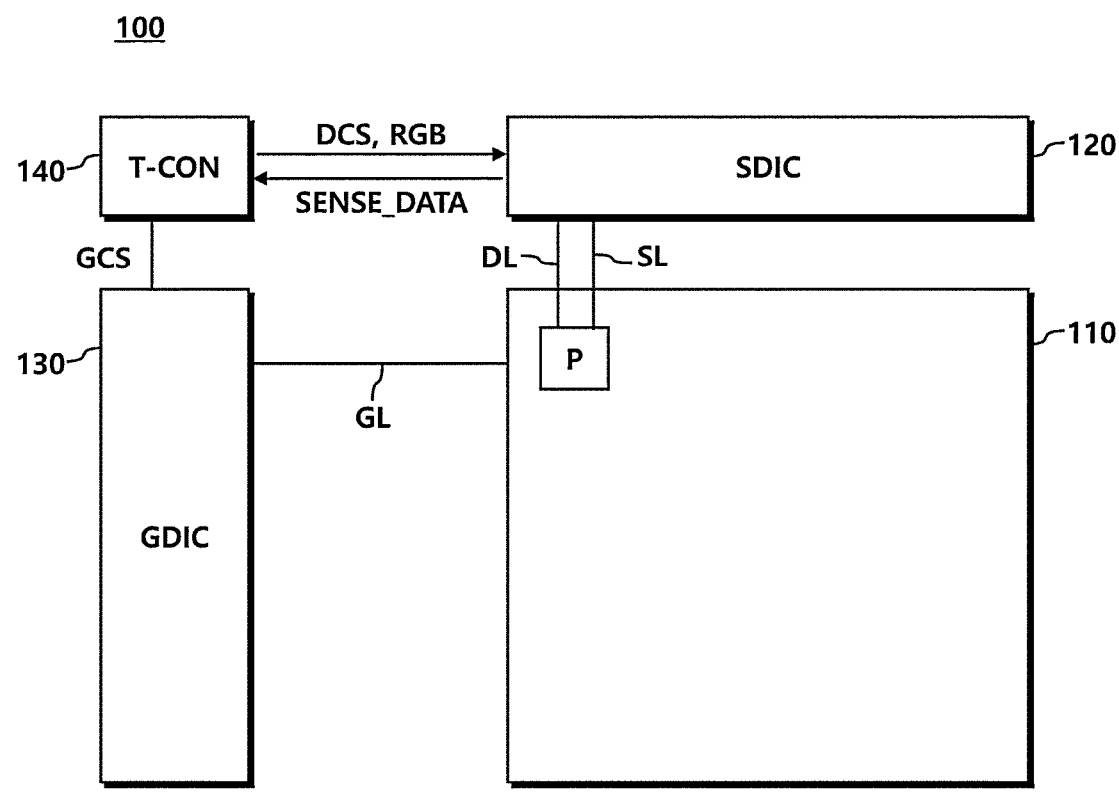
FIG. 1 is a block diagram of a display device according to an embodiment.

FIG. 1 is a block diagram of a display device according to an embodiment.

Referring to FIG. 1, a display device 100 may include a panel 110, a source driver 120, a gate driver 130, a timing controller 140, and the like.

On the panel 110, a plurality of data lines DL, a plurality of gate lines GL, and a plurality of sensing lines SL may be disposed, and a plurality of pixels P may be disposed.

The gate driver 130 may supply a scan signal of a turn-on voltage or a turn-off voltage to the gate line GL. When the scan signal of the turn-on voltage is supplied to the pixel P, the corresponding pixel P is connected to the data line DL, and when the scan signal of the turn-off voltage is supplied to the pixel P, the corresponding pixel P is disconnected from the data line DL.

The source driver 120 supplies a data voltage to the data line DL. The data voltage supplied to the data line DL is transferred to the pixel P connected to the data line DL according to the scan signal. The source driver 120 may be referred to as a data driving circuit or a source driver integrated circuit (SDIC).

The source driver 120 may sense a characteristic value (e.g., voltage, current, etc.) formed at each pixel P. The source driver 120 may be connected to each pixel P by a scan line, or may be connected to each pixel P by a separate sensing line. In this case, the sensed signal may be generated by the gate driver 130.

The timing controller 140 may supply various control signals to the gate driver 130 and the source driver 120. The timing controller 140 may generate a gate control signal GCS for starting scanning according to timing implemented in each frame and transmit the generated gate control signal GCS to the gate driver 130. In addition, the timing controller 140 may output image data (e.g., RGB data) converted from externally input image data to a data signal format used by the source driver 120 to the source driver 120. Also, the timing controller 140 may transmit a data control signal DCS for controlling the source driver 120 to supply a data voltage to each pixel P according to each timing.

The timing controller 140 may compensate for and transmit image data (e.g., RGB data) according to characteristics of the pixel P. In this case, the timing controller 140 may receive pixel sensed data SENSE_DATA from the source driver 120. The pixel sensed data SENSE_DATA may include a measurement value for the characteristics of the pixel P. The pixel sensed data SENSE_DATA may include a measurement value of a data voltage output from the source driver 120 to the data line DL. The pixel sensed data SENSE_DATA may include temperature data regarding a temperature of the panel. The timing controller 140 may identify a temperature of the panel from the temperature data and control a power management IC (PMIC) to supply an appropriate voltage to the panel in consideration of the temperature of the panel.

The panel 110 may be an organic light emitting display panel, but is not limited thereto. For example, the pixels P disposed on the panel 110 may include an organic light emitting diode (OLED) and one or more transistors. Characteristics of the OLED and the transistors included in each pixel P may change with time or a surrounding environment, and the source driver 120 may sense the characteristics of these components included in each pixel P and transmit the sensed characteristics to the timing controller 140.

The source driver 120 may be included in one integrated circuit (IC). Also, the source driver 120 and the timing controller 140 may be included in one integrated circuit and may be referred to as an integrated IC.

Embodiments to be described below describe various examples of correcting temperature in an IC including a temperature sensor. In the following description, a source driver (data driving circuit) will be described as an example of an IC, but the IC according to various embodiments is not limited to the source driver.

Figure 2:
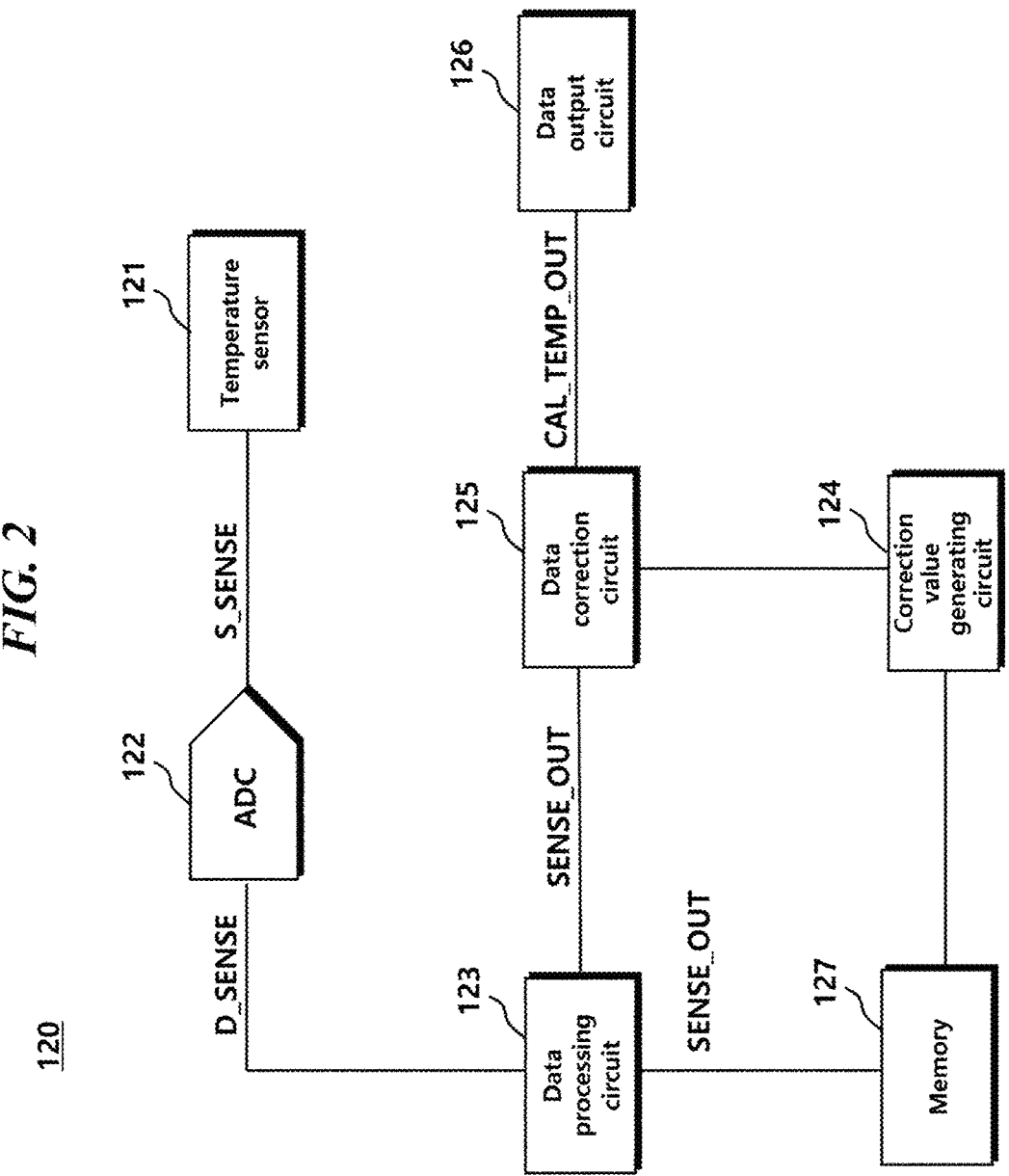
FIG. 2 is a configuration diagram of an integrated circuit including a temperature sensor according to an embodiment.
Figure 3:
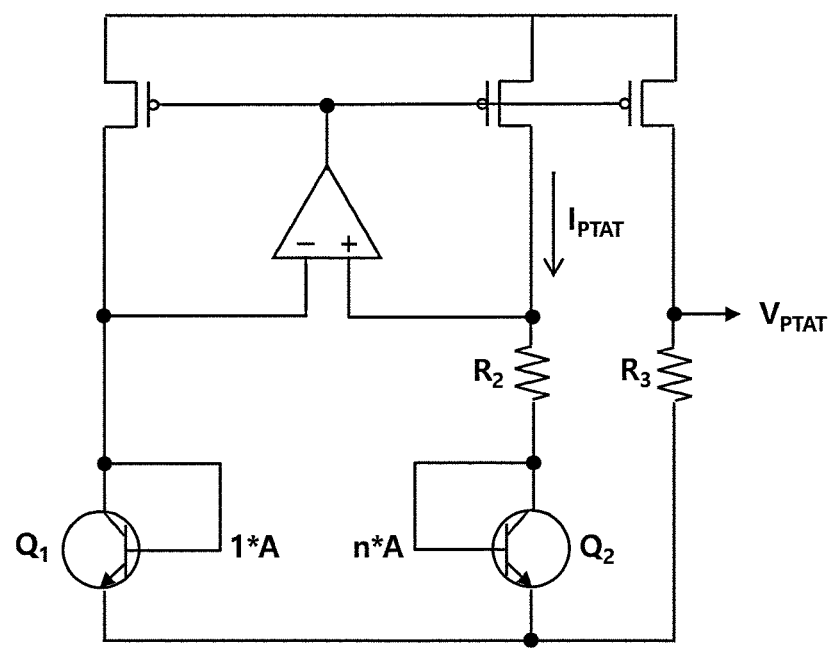
FIG. 3 is a circuit diagram of a temperature sensor according to an embodiment.

FIG. 2 is a configuration diagram of an IC according to an embodiment, and FIG. 3 is a circuit diagram of a temperature sensor according to an embodiment.

Referring to FIG. 2, the IC (e.g., the source driver 120) may include a temperature sensor 121, an analog-to-digital converter (ADC) 122, a data processor 123, a correction value generating circuit 124, a data correction circuit 125, a data output circuit 126, and a memory 127.

The temperature sensor 121 may sense a temperature of the IC (e.g., the source driver 120). The temperature sensor 121 may be included inside the source driver 120 to sense the temperature of the source driver 120 and output a current or voltage corresponding to the sensed temperature.

Referring to FIG. 3, the temperature sensor 121 may include a proportional-to-absolute temperature (PTAT) circuit including a transistor, for example, a bipolar junction transistor (BJT). The temperature sensor 121 may include a metal oxide semiconductor field effect transistor (MOS- FET), an amplifier, and a resistor, in addition to the BJT. The temperature sensor 121 may cause $I_{PTAT}$ or $V_{PTAT}$ due to a voltage difference between BJT terminals that varies according to temperatures. That is, the temperature sensor 121 may generate $I_{PTAT}$ or $V_{PTAT}$ corresponding to an ambient temperature. The relationship between temperature and $I_{PTAT}$ or $V_{PTAT}$ may be proportional. For example, the relationship between the $I_{PTAT}$ or $V_{PTAT}$ sensed by the temperature sensor 121 and the temperature may be expressed by Equation 1 and Equation 2 below.

$$I_{PTAT} = \frac{V_{BE1} - V_{BB2}}{R_2} = \frac{1}{R_2}\frac{kT}{q}\ln(n) \qquad \text{[Equation 1]}$$

$$V_{PTAT} = \frac{R_3}{R_2}\frac{kT}{q}\ln(n) \qquad \text{[Equation 2]}$$

Here, k is the Boltzmann constant, q is the amount of charge, T is a temperature in Kelvin, $R_2$ and $R_3$ are resistance, $V_{BE1}$ is a voltage between a base and an emitter of a first BJT Q1, and $V_{BE2}$ is a voltage between a base and an emitter of a second BJT Q2, respectively. In ln(n), n is a coefficient representing a scale of a contact area A between the base and the emitter, and is a constant. Therefore, according to <Equation 1> and <Equation 2>, since $I_{PTAT}$ or $V_{PTAT}$ may be expressed as a function of a linear expression for T, respectively, the temperature sensor 121 may measure or estimate a temperature by sensing $I_{PTAT}$ or $V_{PTAT}$ proportional to T.

Referring back to FIG. 2, the temperature sensor 121 may output a sensed signal S_SENSE corresponding to the temperature. The sensed signal S_SENSE may include an analog voltage signal or a current signal. In the following description, the voltage signal will be described as an example. The voltage signal may be a value corresponding to $V_{PTAT}$ of <Equation 2>. The temperature sensor 121 may transmit the sensed signal S_SENSE to the ADC 122.

The ADC 122 may convert the analog sensed signal S_SENSE into a digital signal to generate digital sensed data D_SENSE. For example, the sensed signal S_SENSE may include an analog voltage value, and the digital sensed data D_SENSE may include a digital voltage value. The digital sensed data D_SENSE may be corrected by a correction value or a function in the data correction circuit 125 after being filtered by the data processor 123, and a detailed description thereof will be provided later.

The data processor 123 may process the digital sensed data D_SENSE. The data processor 123 may remove noise for the digital sensed data D_SENSE and output the processed sensed data SENSE_OUT. The processed sensed data SENSE_OUT may include digitized voltage data. The data processor 123 may provide the processed sensed data SENSE_OUT to the memory 127 and the data correction circuit 125.

The correction value generating circuit 124 may obtain a correlation between temperature and voltage based on the data stored in the memory 127 and correct the correlation or generate a correction value for correcting the correlation. The data correction circuit 125 may calculate or estimate a new temperature (e.g., a corrected ambient temperature) based on the corrected correlation or correction value. For example, the correlation may include a function using temperature and voltage as variables, and may be represented by a graph shown in FIG. 6 or FIG. 9 to be described later.

For example, the correction value generating circuit 124 may generate a function or a correction value between the temperature and the voltage from the processed sensed data SENSE_OUT stored in the memory 127. The correction value generating circuit 124 may generate a function between the temperature and voltage from the temperature data stored in the memory 127 and the voltage data included in the processed sensed data SENSE_OUT, and transmit the function or a correction value based on the function as data to the data correction circuit 125. A specific embodiment in which the correction value generating circuit 124 generates a function between temperature and voltage or a correction value will be described later with reference to FIG. 4.

The data correction circuit 125 may calculate calibrated temperature data CAL_TEMP_OUT using a function provided from the correction value generating circuit 124 or a correction value based on the function. For example, the data correction circuit 125 may receive the function data FUNCTION or the correction value from the correction value generating circuit 124 and receive the processed sensed data SENSE_OUT from the data processor 123. The data correction circuit 125 may generate or calculate the calibrated temperature data CAL_TEMP_OUT by applying the function or the correction value included in the function data FUNCTION to the processed sensed data SENSE_OUT. When the temperature sensor 121 is included in the source driver 120 and operates, the calibrated temperature data CAL_TEMP_OUT may be regarded as a temperature of the source driver 120. For example, the calibrated temperature data CAL_TEMP_OUT is a temperature estimated by data sensed in an IC (e.g., the source driver 120) and may be referred to as an external temperature or an ambient temperature. Also, if it is assumed that heat of the panel 110 is conducted to the source driver 120, the calibrated temperature data CAL_TEMP_OUT may be regarded as a temperature of the panel 110.

The data output circuit 126 may output the calibrated temperature data CAL_TEMP_OUT. According to an embodiment, the data output circuit 126 may set an output value for the calibrated temperature data CAL_TEMP_OUT. The data output circuit 126 may output the set temperature data. For example, the data output circuit 126 may reduce the number of bits of the calibrated temperature data CAL_TEMP_OUT. When the calibrated temperature data CAL_TEMP_OUT includes a decimal point, the data output circuit 126 may remove a bit representing the decimal point. For example, the data output circuit 126 may convert 16-bit calibrated temperature data CAL_TEMP_OUT to output 10-bit code-down temperature data DDIC_TEMP. Alternatively, the data output circuit 126 may set a digitally signed code to the calibrated temperature data CAL_TEMP_OUT.

Figure 4:
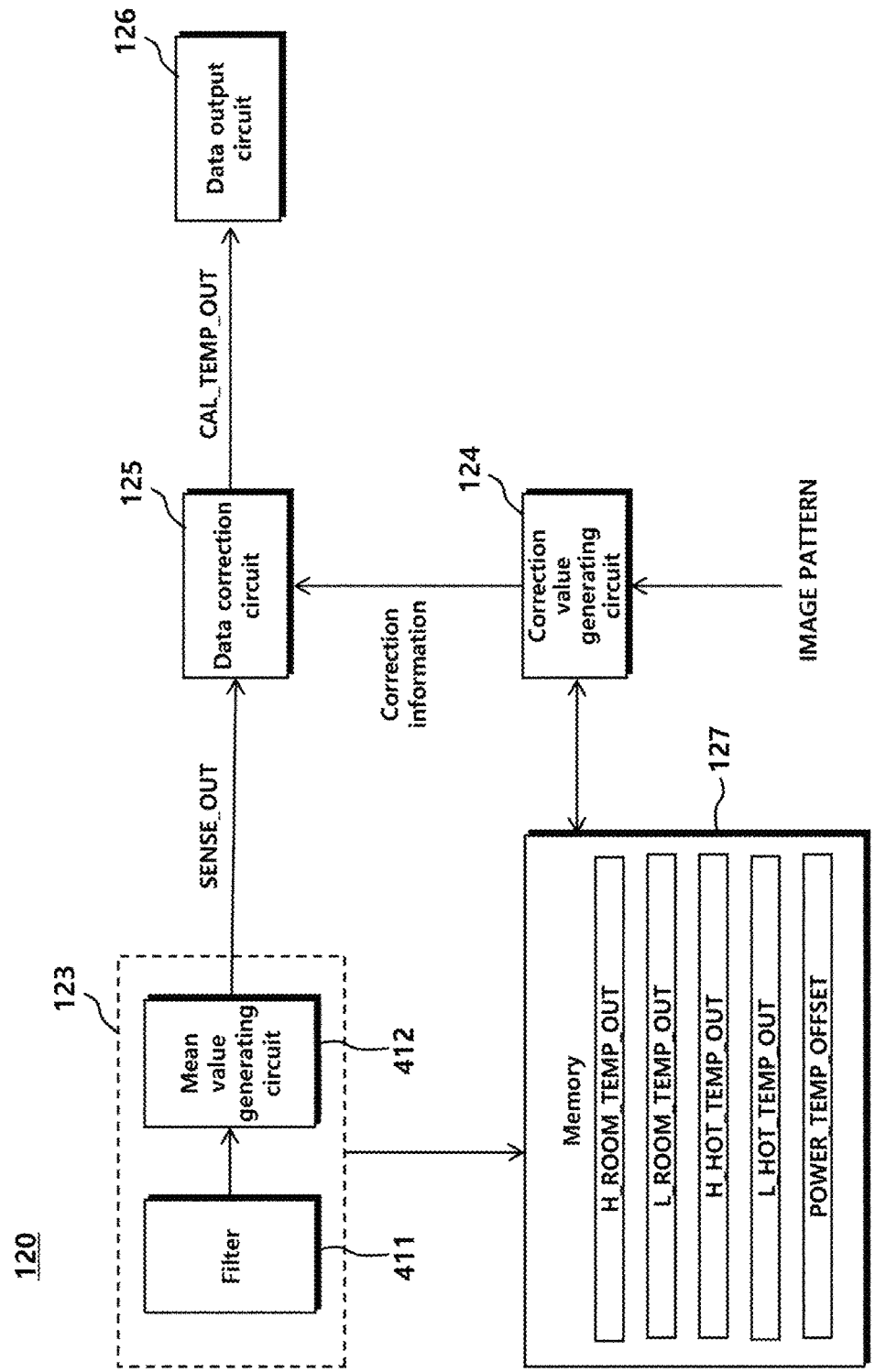
FIG. 4 is a configuration diagram of a source driver having a temperature sensor according to an embodiment.
Figure 5:
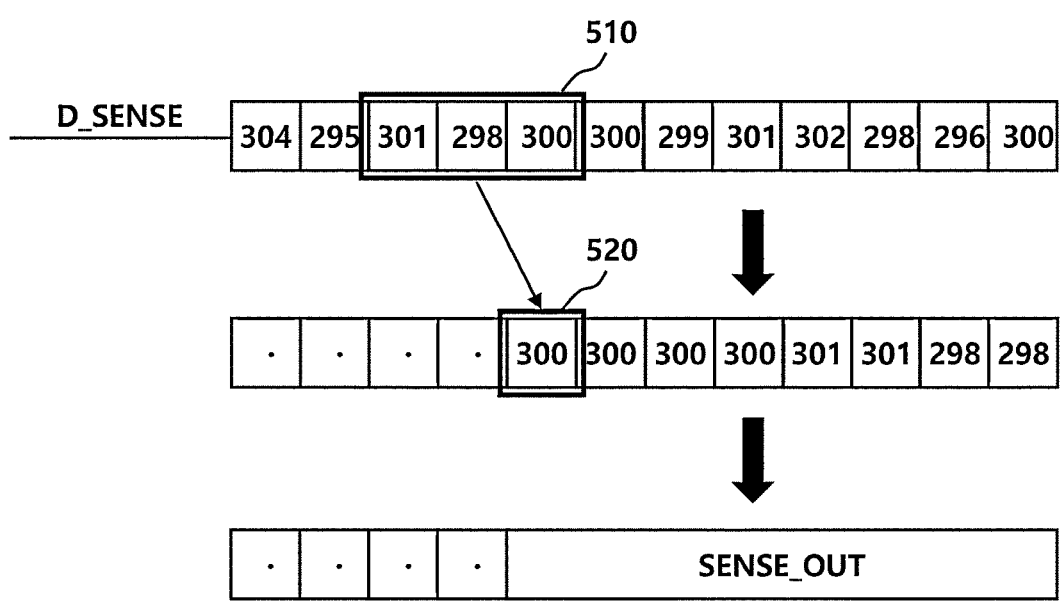
FIG. 5 is a diagram illustrating a process of processing data according to an embodiment.
Figure 6:
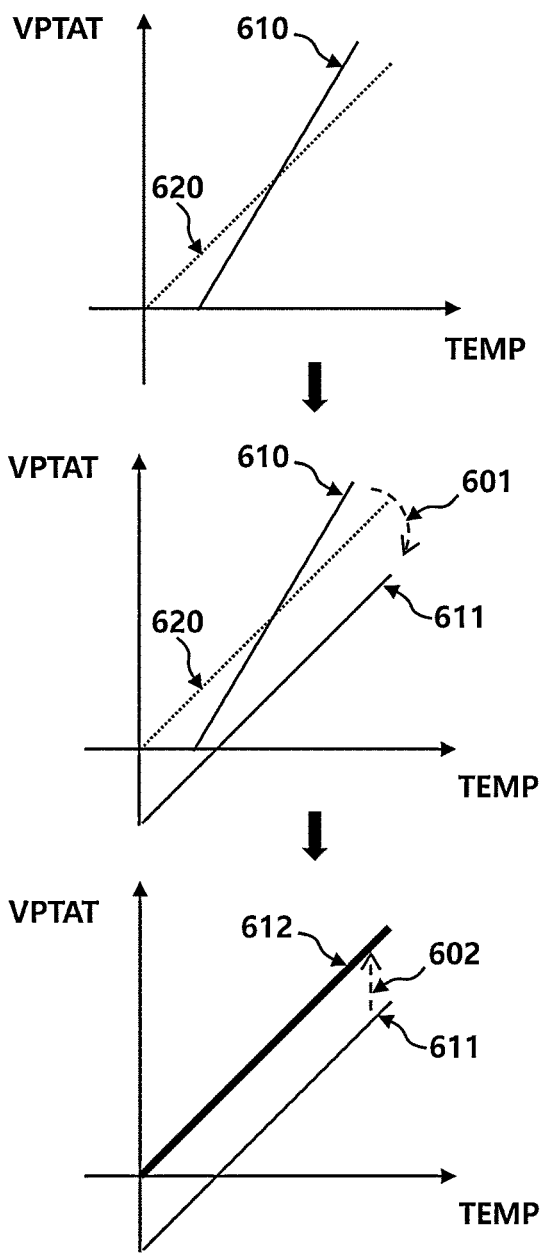
FIG. 6 is a diagram illustrating a process of generating a function according to an embodiment.

FIG. 4 is a configuration diagram of a source driver having a temperature sensor according to an embodiment. FIG. 5 is a diagram illustrating a process of processing data according to an embodiment. FIG. 6 is a diagram illustrating a process of generating a function according to an embodiment.

Referring to FIG. 4, the data processor 123 may include a filter 411 and a mean value generating circuit 412. The data processor 123 may remove noise for the digital sensed data D_SENSE through the filter 411 and the mean value generating circuit 412.

Referring to FIG. 5, a noise removal process by the filter 411 and the mean value generating circuit 412 is illustrated. First, the filter 411 may acquire a median value from data sensed by the temperature sensor 121 (e.g., the digital sensed data D_SENSE). The filter 411 may receive the digital sensed data D_SENSE from the ADC 122. The filter 411 may sample the digital sensed data D_SENSE in a predetermined number and calculate a median value from the sampled data.

For example, the filter 411 may receive a series of digital sensed data D_SENSE arranged in the order of 304, 295, 301, 298, 300, 300, . . . . Each digital sensed data D_SENSE may be transmitted in the form of 10-bit binary numbers. However, the present disclosure is not limited thereto, and the digital sensed data D_SENSE may be expanded to be more than or reduced to be less than 10 bits according to design. The filter 411 may extract a plurality of digital sensed data D_SENSE through a sampling window 510. According to the digital sensed data D_SENSE, the sampling window 510 may also sample 10 bits as a unit, and the unit may be expanded or reduced. The sampling window 510 may selectively extract basic data for calculating a median value from the series of digital sensed data D_SENSE. In this example, the sampling window 510 may sample three consecutive digital sensed data D_SENSE 301, 298, and 300. The filter 411 may calculate a median value 520 for the sampled digital sensed data D_SENSE 301, 298, and 300. In this example, the median value may be 300.

The filter 411 may start sampling from a certain time point of the digital sensed data D_SENSE, and may sample from a starting point or an intermediate point of the received digital sensed data D_SENSE. For example, the filter 411 may sample 304, 295, and 301, starting from 304, which is a starting point of the digital sensed data D_SENSE, or may sample 301, 298, and 300, starting from 301, which is an intermediate point.

The filter 411 may generate a plurality of median values. In order to generate a plurality of median values, the filter 411 may move the sampling window 510 in a predetermined unit to perform sampling, and then may continue to generate median values from the sampled digital sensed data D_SENSE. For example, after sampling for 301, 298, and 300, the filter 411 may move the sampling window 510 by one unit to sample 298, 300, and 300. The filter 411 may calculate a median value 300 from 298, 300, and 300.

The mean value generating circuit 412 may calculate a mean value from a plurality of median values generated from the digital sensed data D_SENSE by the filter 411. The mean value generating circuit 412 may calculate a mean value for all or some of the plurality of median values. The mean value generating circuit 412 may generate an accurate mean value by indicating a decimal point as well. The mean value generating circuit 412 may generate the processed sensed data SENSE_OUT including the mean value.

For example, the mean value generating circuit 412 may receive the median value data from the filter 411. The filter 411 may generate median value data including 300, 300, 300, 300, 301, 301, 298, and 298 by moving the sampling window 510 by one unit from 301, 298, and 300. The mean value generating circuit 412 may calculate an average of 299.750 for 300, 300, 300, 300, 301, 301, 298, and 298. The mean value generating circuit 412 may generate the processed sensed data SENSE_OUT consisting of a total of 16 bits. The total number of bits of the processed sensed data SENSE_OUT may be expanded to be more than 16 bits or reduced to be less than 16 bits.

Referring back to FIG. 4, the processed sensed data SENSE_OUT may be stored in the memory 127 to correspond to the temperature data. The correction value generating circuit 124 may generate a function between temperature and voltage or a correction value based on the function from voltage data of the stored processed sensed data SENSE_OUT and temperature data corresponding to the voltage data. The generated function or correction value may be stored in the memory 127. For example, the temperature sensor 121 may sense a signal (e.g., a voltage signal) corresponding to a temperature, output $V_{PTAT}$ according to the sensed signal, and generate voltage data based on the output $V_{PTAT}$. The processed sensed data SENSE_OUT including the voltage data may be matched to the temperature data corresponding to the voltage data and stored in the memory 127. The matching of the processed sensed data (SENSE_OUT) and the temperature data and the result may be stored in advance.

The digital sensed data D_SENSE, which is a sensing result of the temperature sensor 121, is converted into the processed sensed data SENSE_OUT through the ADC 122 and the data processor 123, and the processed sensed data SENSE_OUT may be matched to the temperature corresponding thereto and stored in the memory 127. When the temperature sensor 121 continuously performs a sensing operation, processed sensed data SENSE_OUT generated for each sensing operation may be stored in the memory 127 together with the temperature data.

For example, the temperature sensor 121 may cause $V_{PTAT}$ at room temperature (e.g., 25° C. or 30° C.) and generate a sensed signal including a voltage value representing $V_{PTAT}$ at room temperature. The ADC 122 may convert the sensed signal into a digital signal, and the data processor 123 may process the sensed signal converted into the digital signal to generate room temperature processed sensed data ROOM_TEMP_OUT. The room temperature processed sensed data ROOM_TEMP_OUT may be stored in the memory 127 together with temperature data for room temperature (e.g., 25° C. or 30° C.).

Also, the temperature sensor 121 may cause $V_{PTAT}$ at a high temperature (e.g., 85° C. or 90° C.) and generate a sensed signal including a voltage value indicating $V_{PTAT}$ at a high temperature. The ADC 122 may convert the sensed signal into a digital signal, and the data processor 123 may process the sensed signal converted into the digital signal to generate high temperature processed sensed data HOT_TEMP_OUT. The high temperature processed sensed data HOT_TEMP_OUT may be stored in the memory 127 together with temperature data for a high temperature (e.g., 85° C. or 90° C.).

The correction value generating circuit 124 may read a plurality of processed sensed data SENSE_OUT and a plurality of temperature data corresponding thereto from the memory 127, and generate the function or the function-based correction value from the plurality of read processed sensed data SENSE_OUT and a plurality of temperature data. According to an embodiment, the correction value generating circuit 124 may calculate a gain coefficient $K_{GAIN}$ and an offset coefficient $K_{OFFSET}$ by the following <Equation 3> and <Equation 4> as a coefficient or a correction value of a function between temperature and voltage. According to an embodiment, ROOM_IDEAL_CODE in the following <Equation 4> is a preset value related to a room temperature.

$$K_{GAIN} = \frac{\text{HOT\_TEMP\_OUT} - \text{ROOM\_TEMP\_OUT}}{\text{HOT Temperature}(90°\text{C.}) - \text{Room Temperature}(30°\text{C.})} \quad \text{[Equation 3]}$$

$$K_{OFFSET} = \frac{1}{K_{GAIN}} \cdot \text{ROOM\_TEMP\_OUT} - \text{ROOM\_IDEAL\_CODE} \quad \text{[Equation 4]}$$

According to an embodiment, the data correction circuit 125 may calculate the calibrated temperature data CAL_TEMP_OUT as expressed by <Equation 5> by applying the coefficients or correction values of <Equation 3> and <Equation 4> to the processed sensed data SENSE_OUT output from the data processor 123.

$$\text{CAL\_TEMP\_OUT} = \frac{1}{K_{GAIN}} \cdot \text{SENSE\_OUT} - K_{OFFSET} \quad \text{[Equation 5]}$$

Referring to FIG. 6, a function generating process by the correction value generating circuit 124 is illustrated. The correction value generating circuit 124 may generate a function representing the relationship between temperature and voltage by using a plurality of processed sensed data SENSE_OUT and a plurality of temperature data corresponding thereto. The processed sensed data SENSE_OUT may include voltage data for $V_{PTAT}$ output by the temperature sensor 121. If there are two or more pieces of temperature data and voltage data corresponding thereto, the correction value generating circuit 124 may derive one straight line by connecting two or more coordinates in a coordinate plane with the x-axis TEMP as the temperature and the y-axis VPTAT as the voltage. The correction value generating circuit 124 may generate a linear function in the form of a straight line in the x-y plane, and the linear function may represent a correlation between temperature and voltage. In this manner, generating a function through two or more voltage data and two or more temperature data may be referred to as two-point calibration.

For example, room temperature processed sensed data ROOM_TEMP_OUT and corresponding room temperature data and high temperature processed sensed data HOT_TEMP_OUT and corresponding high temperature data may be stored in the memory 127. The correction value generating circuit 124 may generate a linear function in the form of a straight line connecting the room temperature data and the room temperature processed sensed data ROOM_TEMP_OUT to one point and connecting the high temperature data and the high temperature processed sensed data HOT_TEMP_OUT to the opposite point. For example, the correction value generating circuit 124 may generate a second calibration function 612 from the $V_{PTAT}$ at 30° C. and 30° C. and the $V_{PTAT}$ at 90° C. and 90° C. The second calibration function 612 may coincide with an ideal function 620 (indicated by the dotted line). Here, the ideal function 620 (indicated by the dotted line) may represent a target shape of the function generated by the correction value generating circuit 124. Also, the ideal function 620 (indicated by the dotted line) may represent a correlation between a temperature and a voltage targeted by the correction value generating circuit 124.

For example, before calibrating the sensed temperature data, the source driver 120 may have a correlation between temperature and voltage, such as the basic function 610. Here, the basic function 610 is a correlation between a temperature and a voltage that the source driver 120 has from when it is manufactured, and may be caused by a manufacturing defect. A correlation such as the basic function 610 may not be a target of the correction value generating circuit 124. Alternatively, the basic function 610 may refer to a correlation between temperature and voltage including an error. Through a two-point calibration of the correction value generating circuit 124 for correlation, the source driver 120 may store the correlation such as the ideal function 620 (indicated by the dotted line), not the correlation such as the basic function 610, in the memory 127. It may be understood that the function (correlation) is calibrated as follows, while the correction value generating circuit 124 performs a calibration operation.

For example, the correction value generating circuit 124 may generate a first calibration function 611 by correcting a slope of the basic function 610 to match a slope of the ideal function 620 (indicated by the dotted line). The slope correction is a first calibration 601, and the slope of the first calibration function 611 and the slope of the ideal function 620 (indicated by the dotted line) may be made equal to each other through the first calibration 601.

Next, the correction value generating circuit 124 may generate a second calibration function 612 by compensating for a y-intercept of the first calibration function 611 to match a y-intercept of the ideal function 620 (indicated by the dotted line). The compensation for the y-intercept is a second calibration 602, which may be referred to as an offset calibration. The y-intercept of the second calibration function 612 and the y-intercept of the ideal function 620 (indicated by the dotted line) may be made equal to each other through the second calibration 602.

Ultimately, the correction value generating circuit 124 may generate the second calibration function 612 matching the ideal function 620 (indicated by the dotted line) which is the correlation between a target temperature and the voltage $V_{PTAT}$ through two calibrations for the slope and the y-intercept of the basic function 610.

Referring back to FIG. 4, the data correction circuit 125 may generate new temperature data based on function data FUNCTION by applying new voltage data to the function data FUNCTION.

For example, the data correction circuit 125 may receive the function data FUNCTION from the correction value generating circuit 124. Here, the function data FUNCTION may be a result of the correction value generating circuit 124 performing calibration on a function generated from a plurality of processed sensed data SENSE_OUT and temperature data stored in the memory 127, and may include the gain coefficient and an offset coefficient calculated by <Equation 3> and <Equation 4> described above. For example, the correction value generating circuit 124 may generate the second calibration function 612 from the room temperature processed sensed data ROOM_TEMP_OUT and room temperature data of 30° C. and the high temperature processed sensed data HOT_TEMP_OUT and high temperature data of 90° C. The function data FUNCTION may include the second calibration function 612, and the data correction circuit 125 may receive the second calibration function 612 from the correction value generating circuit 124.

The data correction circuit 125 may generate new temperature data by applying the new voltage data included in the processed sensed data SENSE_OUT to the function data FUNCTION. The data correction circuit 125 may generate new temperature data based on the function data FUNCTION by applying the voltage data included in the processed sensed data SENSE_OUT to the function data FUNCTION. For example, the data correction circuit 125 may generate new temperature data according to <Equation 5> above. The new temperature data may be referred to as calibrated temperature data CAL_TEMP_OUT.

Specifically, the data correction circuit 125 may apply the voltage data included in the processed sensed data SENSE_OUT to the second calibration function 612 included in the function data FUNCTION to calculate the calibrated temperature data CAL_TEMP_OUT. Here, the processed sensed data SENSE_OUT applied to the second calibration function 612 may be the same as or different from that used for generating the second calibration function 612. That is, when the second calibration function 612 is generated from the room temperature processed sensed data ROOM_TEMP_OUT and the high temperature processed sensed data HOT_TEMP_OUT, the processed sensed data SENSE_OUT applied to the second calibration function 612 may be any one of the room temperature processed sensed data ROOM_TEMP_OUT and the high temperature processed sensed data HOT_TEMP_OUT or any other processed sensed data SENSE_OUT than the room temperature processed sensed data ROOM_TEMP_OUT and the high temperature processed sensed data HOT_TEMP_OUT.

For example, when the data correction circuit 125 applies $V_{PTAT}$ corresponding to the room temperature of 30° C. to the second calibration function 612, the corresponding calibrated temperature data CAL_TEMP_OUT may be generated. The calibrated temperature data CAL_TEMP_OUT may refer to a temperature value of 30° C. Alternatively, when the data correction circuit 125 applies the $V_{PTAT}$ corresponding to the high temperature of 90° C. to the second calibration function 612, the corresponding calibrated temperature data CAL_TEMP_OUT may be generated. The calibrated temperature data CAL_TEMP_OUT may refer to a temperature value of 90° C.

The data correction circuit 125 may apply the processed sensed data SENSE_OUT to the basic function 610 before calibration, while applying the processed sensed data SENSE_OUT to the second calibration function 612 after the calibration. Accordingly, the output temperature data before calibration and the calibrated temperature data CAL_TEMP_OUT after calibration may be different from each other. Here, the temperature data output before the calibration may be regarded as reflecting an error, but the calibrated temperature data CAL_TEMP_OUT after the calibration may be regarded as data without an error.

The source driver 120 according to an embodiment may correct the temperature value by finding an ideal linear function between temperature and voltage and matching the existing correlation (function). In addition, the source driver 120 according to an embodiment may use arbitrary two points between digitally expressed temperature and voltage without the need to satisfy specific conditions such as order, and store data necessary for calibration in the memory 127 and used.

The data output circuit 126 may output the calibrated temperature data CAL_TEMP_OUT and a new temperature value corresponding thereto. Before the output, the data output circuit 126 may process and output the calibrated temperature data CAL_TEMP_OUT. For example, the data output circuit 126 may reduce the number of bits of the calibrated temperature data CAL_TEMP_OUT. When the processed sensed data SENSE_OUT consists of 16 bits, the data output circuit 126 may reduce the calibrated temperature data CAL_TEMP_OUT to 8 bits to remove a decimal point and output the same.

According to another embodiment, the correction value generating circuit 124 may generate a correlation or a correction value between the temperature and voltage $V_{PTAT}$ described above based on an image (e.g., image pattern, luminance of the image, or a color of the image) displayed through the panel 110 using the source driver 120 or a displayed application. For example, when a data voltage corresponding to a specific image (e.g., image pattern, luminance of the image, or a color of the image) or a displayed application is output through the source driver 120, even at the same external or ambient temperature, the temperature data output through the temperature sensor 121 included in the source driver 120 may vary depending on an image displayed through the panel 110 (e.g., image pattern, luminance of the image, or a color of the image) or the displayed application. Accordingly, the temperature measured or estimated through the temperature sensor 121 of the source driver 120 may have an error with an actual external temperature or ambient temperature.

According to an embodiment, the correction value generating circuit 124 may identify the amount of power consumed in the source driver to correspond to the at least one image (e.g., image pattern, luminance of the image, or a color of the image) displayed through the panel 110 or a displayed application and generate a compensation value for an error that occurs according to a change in the amount of power when measuring or estimating a temperature through the temperature sensor 121. For example, when a data voltage corresponding to a specific image (e.g., image pattern, luminance of the image, or a color of the image) or a specific application is output in a state in which the source driver 120 is maintained at a specific temperature (e.g., 30° C. or 90° C.), the amount of power consumed by the source driver 120 and output data of the temperature sensor 121 may be mapped and stored in the memory 127. Thereafter, the correction value generating circuit 124 may identify the amount of power consumed by the source driver 120 when measuring or estimating the temperature of the source driver 120 or the panel 110 through the temperature sensor 121. For example, the source driver 120 may identify the amount of power consumed by the source driver 120 based on the image (e.g., an image pattern, luminance of an image, or color of an image) displayed through the panel 110 or the displayed application. The correction value generating circuit 124 may generate a correction value corresponding to the identified amount of power. The data correction circuit 125 may calculate the calibrated temperature data CAL_TEMP_OUT by using the correction value provided from the correction value generating circuit 124. That is, the data correction circuit 125 may receive a correction value corresponding to the amount of power from the correction value generating circuit 124, and may receive processed sensed data SENSE_OUT from the data processor 123. The data correction circuit 125 may calculate the calibrated temperature data CAL_TEMP_OUT by applying the correction value corresponding to the amount of power to the processed sensed data SENSE_OUT.

Figure 7:
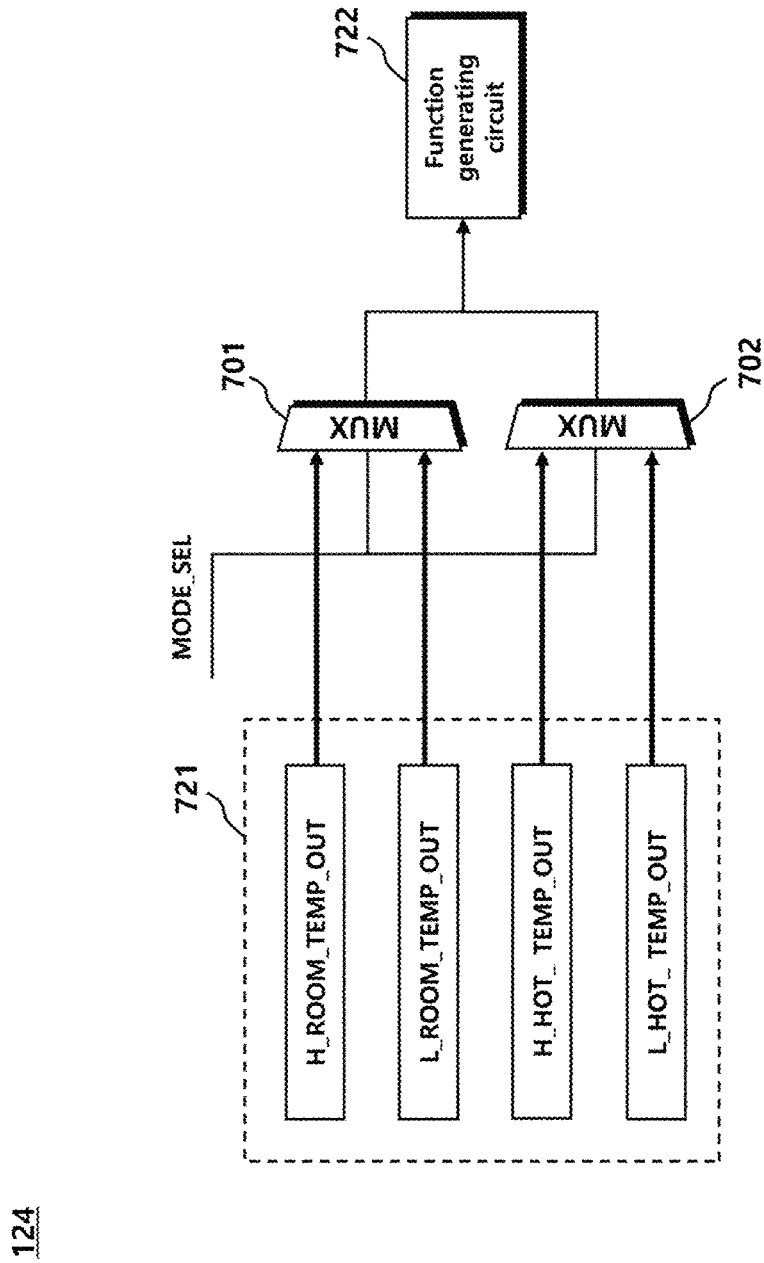
FIG. 7 is a diagram illustrating a process of generating a correction value according to a mode in a correction value generating circuit according to an embodiment.

FIG. 7 is a diagram illustrating a process of generating a correction value according to a mode in the correction value generating circuit according to an embodiment.

Referring to FIG. 7, the correction value generating circuit 124 may perform a different calibration process by selectively using the stored processed sensed data SENSE_OUT according to a display mode. For example, even if the source driver 120 outputs the calibrated temperature data according to a correlation (e.g., a function) between temperature and voltage, the calibrated temperature data may have an error due to some factors. For example, a ground voltage of the temperature sensor 121 may rise. When the ground voltage rises, the $V_{PTAT}$ generated by the temperature sensor 121 changes and the temperature data output based on the $V_{PTAT}$ may not properly reflect the actual temperature of the source driver 120. A change in power consumption of the source driver 120 or parasitic resistance caused by a wire may cause a change in the ground voltage.

For another example, when the source driver 120 consumes a lot of power, the internal temperature of the source driver 120 may rise. When the internal temperature rises, the $V_{PTAT}$ generated by the temperature sensor 121 changes and the temperature data output based on the $V_{PTAT}$ may not properly reflect the actual temperature of the source driver 120 (e.g., the ambient temperature or the external temperature of the source driver 120).

As described above, the power consumption of the source driver 120 that causes an error in the temperature data may define a display mode according to the size. For example, the display mode may include a high power mode and a low power mode. The high power mode may refer to a case in which the source driver 120 operates, while consuming a lot of power. The low power mode may refer to a case in which the source driver 120 operates, while consuming less power. For example, in the high power mode, a current of 10 mmA may flow in the source driver 120, and in the low power mode, a current of 100 μA may flow in the source driver 120.

According to an embodiment, the display mode may vary according to the driving mode of the source driver 120. For example, when the panel outputs an image at a high refresh rate (RR), the source driver 120 continuously supplies a constant data voltage to the panel, so that power consumption and a corresponding amount of heat generated by the source driver 120 are relatively high and the temperature of the source driver 120 may also be increased. The display device 100 including the source driver 120 may operate in the high power mode (driving mode). In this case, only the temperature of the source driver 120 may be locally high inside the display device 100. Meanwhile, when the panel outputs an image at a low refresh rate, the source driver 120 supplies a data voltage relatively less continuously compared to a high refresh rate, so power consumption of the source driver 120 and a corresponding amount of heat generated by the source driver 120 are also small and the temperature of the source driver 120 may also be lowered. The display device 100 including the source driver 120 may operate in the low power mode (standby mode). In this case, only the temperature of the source driver 120 may be locally low inside the display device 100. According to an embodiment, the display mode of the source driver 120 may affect an error of the temperature sensor 121. For example, the error of the temperature sensor 121 may vary depending on the display mode of the source driver 120. The temperature sensor 121 may measure or estimate the temperature to be different from the actual temperature in the high power mode and the low power mode of the source driver 120. Accordingly, the correction value generating circuit 124 of the source driver 120 may perform the calibration in the high power mode and the calibration in the low power mode differently. The correction value generating circuit 124 may selectively read data for calibration of each display mode according to the display mode and use it for calibration.

According to an embodiment, for differential calibration according to the display mode, the correction value generating circuit 124 may read different data from the memory 721 according to the display mode and generate a function from the read data. Here, the processed sensed data SENSE_OUT (voltage data) is matched to corresponding temperature data and stored together in the memory 721, and the stored information may be read from the memory 721.

For example, the processed sensed data SENSE_OUT may be stored in the memory 721 for each display mode. The display mode may include a high power mode and a low power mode. The high power mode may refer to a case in which power consumption and heat generation of the source driver 120 are relatively large, and the low power mode may refer to a case in which power consumption and heat generation of the source driver 120 are relatively small. Therefore, processed sensed data SENSE_OUT such as high power room temperature processed sensed data H_ROOM_TEMP_OUT and high power high temperature processed sensed data H_HOT_TEMP_OUT used in the high power mode and low power room temperature processed sensed data L_ROOM_TEMP_OUT and low power high temperature processed sensed data L_HOT_TEMP_OUT used in the low power mode may be stored in the memory 721.

According to an embodiment, the correction value generating circuit 124 may select different processed sensed data SENSE_OUT according to the display mode through the multiplexers (muxes) 701 and 702. For example, the multiplexers 701 and 702 may include a first mux 701, to which the high power room temperature processed sensed data H_ROOM_TEMP_OUT and the low power room temperature processed sensed data L_ROOM_TEMP_OUT are input, and a second mux 702, to which the high power high temperature processed sensed data H_HOT_TEMP_OUT and the low power high temperature processed sensed data L_HOT_TEMP_OUT are input.

The multiplexers 701 and 702 may receive a mode selection signal MODE_SEL. The mode selection signal MODE_SEL may control the multiplexers 701 and 702 to select different processed sensed data SENSE_OUT from the memory 721 according to the display mode of the source driver 120. For example, when the multiplexers 701 and 702 receive the mode selection signal MODE_SEL for selecting a first mode, the first mux 701 may read the high power room temperature processed sensed data H_ROOM_TEMP_OUT and the second mux 702 may read the high power high temperature processed sensed data H_HOT_TEMP_OUT from the memory 721. Alternatively, when the multiplexers 701 and 702 receive the mode selection signal MODE_SEL for selecting a second mode, the first mux 701 may read the low power room temperature processed sensed data L_ROOM_TEMP_OUT and the second mux 702 may read the low power high temperature processed sensed data L_HOT_TEMP_OUT from the memory 721.

The correction value generating circuit 124 may receive the processed sensed data SENSE_OUT from the multiplexers 701 and 702 and output the calibrated temperature data CAL_TEMP_OUT through generation of a function. For example, when the multiplexers 701 and 702 receive the mode selection signal MODE_SEL for selecting the first mode, the correction value generating circuit 124 may generate high power room temperature processed sensed data H_ROOM_TEMP_OUT and high power high temperature processed sensed data H_HOT_TEMP_OUT and perform slope compensation and y-intercept compensation for the function to generate a compensation function. The data correction circuit 125 may calculate the calibrated temperature data CAL_TEMP_OUT by applying the processed sensed data SENSE_OUT to the compensation function. Alternatively, when the multiplexers 701 and 702 receive the mode selection signal MODE_SEL for selecting the second mode, the correction value generating circuit 124 may generate a function from the low power room temperature processed sensed data L_ROOM_TEMP_OUT and the low power high temperature processed sensed data L_HOT_TEMP_OUT. The function may be generated by correcting the slope and y-intercept of the function. The data correction circuit 125 may calculate the calibrated temperature data CAL_TEMP_OUT by applying the processed sensed data SENSE_OUT to the function.

In the above description, the first mode refers to the high power mode and the second mode refers to the low power mode. However, depending on a connection method or the characteristics of the mode selection signal MODE_SEL, the first mode may refer to the low power mode and the second mode may refer to the high power mode.

As described above, data is differentially used according to the power consumption (or display mode) of the source driver 120 according to the panel driving, so an error between the sensing temperature and the actual temperature caused by the power consumption (the amount of generated heat) of the source driver 120 may be improved.

Figure 8:
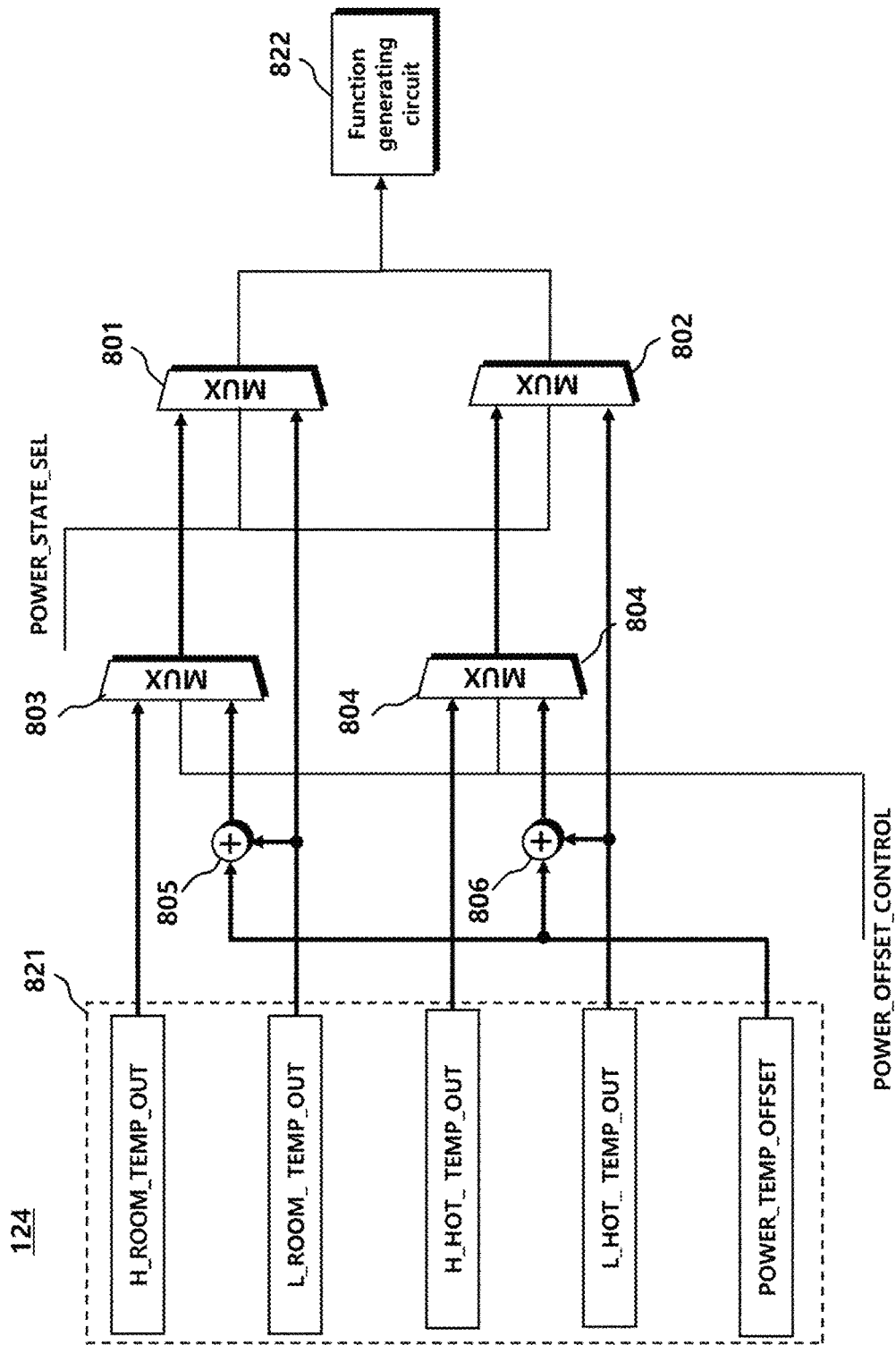
FIG. 8 is a diagram illustrating a process of generating a correction value according to a mode in a correction value generating circuit according to an embodiment.

FIG. 8 is a diagram illustrating a process of generating a correction value according to a mode in the correction value generating circuit according to an embodiment.

Referring to FIG. 8, the correction value generating circuit 124 may use the processed sensed data SENSE_OUT reflecting an offset between power and temperature in a calibration process. Reflecting the offset may include adding or subtracting a specific value to or from data. According to an embodiment, the offset may be reflected in voltage data of the processed sensed data SENSE_OUT. Hereinafter, the processed sensed data SENSE_OUT (voltage data) may be matched to the corresponding temperature data and stored in the memory 821 together. The memory 821 may store the processed sensed data SENSE_OUT for each display mode, and may also store offset data POWER_TEMP_OFFSET between the power and temperature.

The correction value generating circuit 124 may add the offset data POWER_TEMP_OFFSET to the processed sensed data SENSE_OUT stored in the memory 821 through adders 805 and 806. Alternatively, the correction value generating circuit 124 may subtract the offset data POWER_TEMP_OFFSET from the processed sensed data SENSE_OUT stored in the memory 821 through a subtractor (not shown).

The correction value generating circuit 124 may reflect the offset data POWER_TEMP_OFFSET with respect to the processed sensed data SENSE_OUT corresponding to any one display mode.

For example, the adders 805 and 806 may reflect the offset data POWER_TEMP_OFFSET with respect to the processed sensed data SENSE_OUT in the low power mode. The adders 805 and 806 may add an offset value of the offset data POWER_TEMP_OFFSET to the low power room temperature processed sensed data L_ROOM_TEMP_OUT, and may add an offset value to the low power high temperature processed sensed data L_HOT_TEMP_OUT. Alternatively, the adders 805 and 806 may reflect the offset data POWER_TEMP_OFFSET with respect to the processed sensed data SENSE_OUT in the high power mode. The adders 805 and 806 may add an offset value of the offset data POWER_TEMP_OFFSET to the high power room temperature processed sensed data H_ROOM_TEMP_OUT, and may add an offset value to the high power high temperature processed sensed data H_HOT_TEMP_OUT.

The correction value generating circuit 124 may select the high power processed sensed data or the processed sensed data SENSE_OUT reflecting the offset according to the display mode through multiplexers 803 and 804. The multiplexers 803 and 804 may include a third multiplexer 803, to which low power room temperature processed sensed data L_ROOM_TEMP_OUT obtained by adding up the high power room temperature processed sensed data H_ROOM_TEMP_OUT and the offset data POWER_TEMP_OFFSET is input, and a fourth multiplexer 804, to which low power high temperature processed sensed data L_HOT_TEMP_OUT obtained by adding up the high power high temperature processed sensed data H_HOT_TEMP_OUT and the offset data POWER_TEMP_OFFSET is input.

The multiplexers 803 and 804 may receive an offset control signal POWER_OFFSET_CONTROL. The offset control signal POWER_OFFSET_CONTRL may control the multiplexers 803 and 804 to select the processed sensed data SENSE_OUT reflecting the offset data POWER_TEMP_OFFSET from the memory 821 according to the display mode of the display device 100. For example, when the multiplexers 803 and 804 receive the offset control signal POWER_OFFSET_CONTROL for selecting the offset reflected data, the third multiplexer 803 may select the low power room temperature processed sensed data L_ROOM_TEMP_OUT to which the offset data POWER_TEMP_OFFSET is added, and the fourth multiplexer 804 may select the low power high temperature processed sensed data L_HOT_TEMP_OUT to which the offset data POWER_TEMP_OFFSET is added. Alternatively, when the multiplexers 803 and 804 receive an offset selection signal OFFSET_SEL that does not select offset reflected data, the third multiplexer 803 may select high power room temperature processed sensed data H_ROOM_TEMP_OUT and the fourth multiplexer 804 may select high power high temperature processed sensed data H_HOT_TEMP_OUT.

Multiplexers 801 and 802 perform the same function as that of the multiplexers 701 and 702 of FIG. 7, but may differ in that one of the input terminals is connected to an output of the multiplexers 803 and 804. Therefore, when the multiplexers 801 and 802 select the mode selection signal POWER_STATE_SEL for selecting the first mode, the first multiplexer 801 may output data (high power room temperature processed sensed data H_ROOM_TEMP_OUT) output from the third multiplexer 803 or the low power room temperature processed sensed data L_ROOM_TEMP_OUT to which the offset data POWER_TEMP_OFFSET is added, and the second multiplexer 802 may output the data (high power high temperature processed sensed data H_HOT_TEMP_OUT) output from the fourth multiplexer 804 or the low power high temperature processed sensed data L_HOT_TEMP_OUT to which the offset data POWER_TEMP_OFFSET is added. The function generating circuit 822 may generate a function or a correction value using the processed sensed data SENSE_OUT finally output from the multiplexers 801 and 802.

As described above, the correction value generating circuit 124 may generate the calibrated temperature data CAL_TEMP_OUT by selecting the data reflecting the offset data POWER_TEMP_OFFSET for any one mode, as well as selecting different data, according to the high power mode and the low power mode according to the panel driving. In the above example, the offset data POWER_TEMP_OFFSET is reflected in the low power room temperature processed sensed data L_ROOM_TEMP_OUT and the low power high temperature processed sensed data L_HOT_TEMP_OUT used in the low power mode, but the present disclosure is not limited thereto, and the offset data POWER_TEMP_OFFSET may also be reflected in the high power room temperature processed sensed data H_ROOM_TEMP_OUT and high power high temperature processed sensed data H_HOT_TEMP_OUT used in the high power mode.

Figure 9:
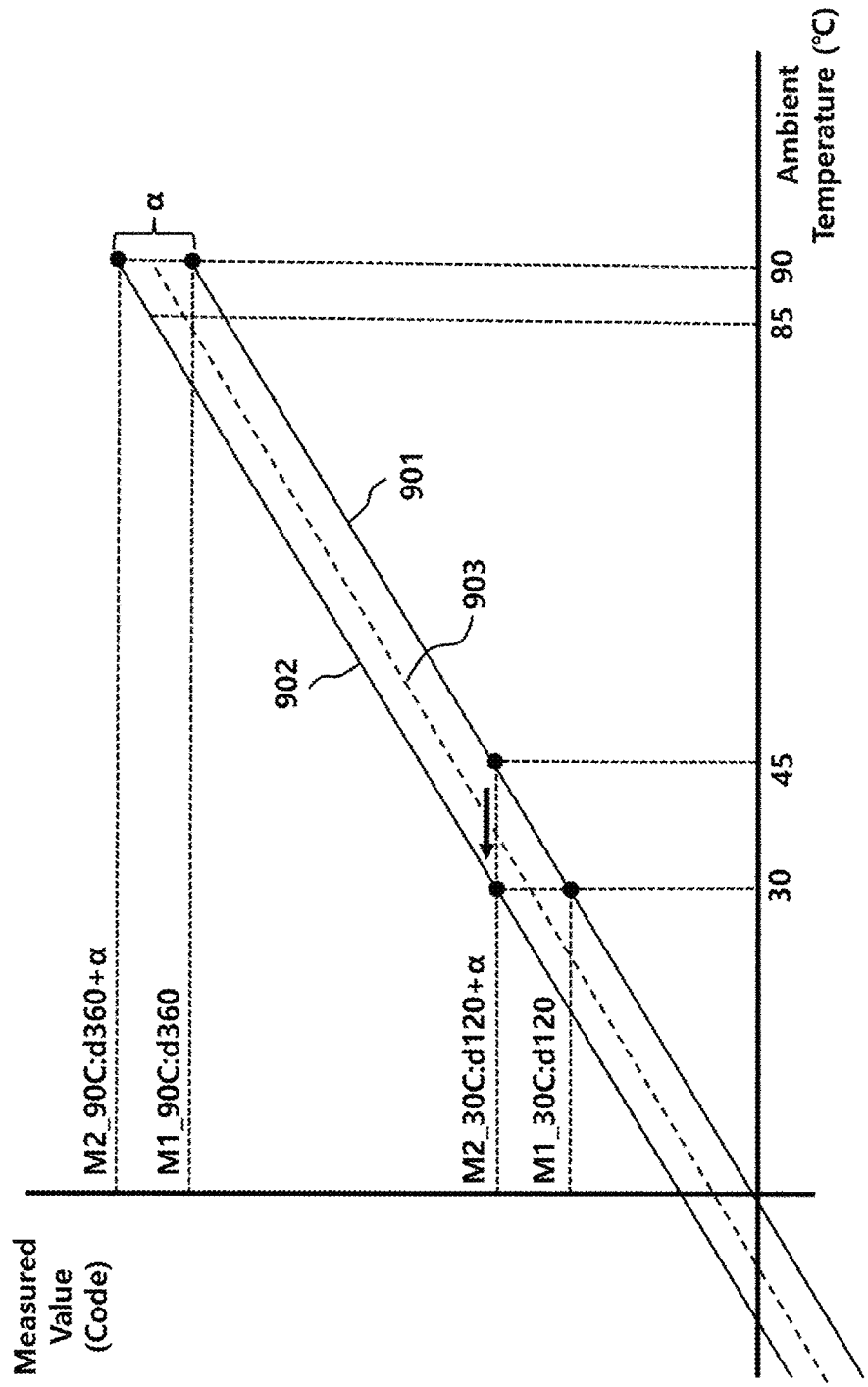
FIG. 9 is a graph illustrating a measurement value of a temperature sensor according to an amount of power according to an embodiment.

FIG. 9 is a graph illustrating a measurement value of a temperature sensor according to the amount of power according to an embodiment. Referring to FIG. 9, the aforementioned correction value generating circuit 124 may generate a function graph 901 generated based on a value measured in the low power mode (e.g., a state in which a current of 100 μA or less flows) of the IC (e.g., the source driver 120) and a function graph 902 generated based on a value measured in a high power mode (e.g., a state in which a current of 10 mA or more flows).

For example, while the IC is in the low power mode and an external temperature (or ambient temperature) is maintained at a first temperature (e.g., 30° C.) (e.g., a temperature of a chuck holding the IC is maintained at the first temperature), a measured value of the temperature sensor may be checked as 'd120'. In the low power mode, the 'd120' may be mapped to 30° C. and stored in the memory 127. Next, in a state in which the IC is in the low power mode and the external temperature (or ambient temperature) is maintained at a second temperature (e.g., 90° C.) (e.g., the temperature of the chuck holding the IC is maintained at the second temperature), a measured value of the temperature sensor may be checked as 'd360'. In the low power mode, the 'd360' may be mapped to 90° C. and stored in the memory 127. A function graph 901 in the low power mode may be generated by the two measured values.

Further, in a state in which the IC is in the high power mode and the external temperature (or ambient temperature) is maintained at the first temperature (e.g., 30° C.) (e.g., the temperature of the chuck holding the IC is maintained at the first temperature), the measured value of the temperature sensor may be checked as 'd120+α'. For example, even at the same first temperature, as the amount of power consumed by the IC increases, the measured value of the temperature sensor may increase compared to the low power mode. According to an embodiment, in the high power mode, the 'd120+α' may be mapped to 30° C. and stored in the memory 127. Next, in a state in which the IC is in the high power mode and the external temperature (or ambient temperature) is maintained at the second temperature (e.g., 90° C.) (e.g., the temperature of the chuck holding the IC is maintained at the second temperature), the measured value of the temperature sensor may be checked as 'd360+α'. In the high power mode, the 'd360+α' may be mapped to 90° C. and stored in the memory 127. A function graph 902 may be generated in the high power mode by the two measured values. According to an embodiment, the low power mode and the high power mode may be a minimum power mode or a maximum power mode respectively operated in the IC, but are not limited thereto.

Referring to FIG. 9, when the measured value of the temperature sensor is checked as 'd120+α' in a state in which the IC is in the high power mode, if the external temperature (or ambient temperature) is measured or estimated using the function graph 901 corresponding to the low power mode, the external temperature (or ambient temperature) may be incorrectly measured or estimated as 45° C. even though an actual temperature is 30° C. Accordingly, in a state in which the IC is in the high power mode, an error due to a change in power consumption may be prevented by measuring or estimating the external temperature (or ambient temperature) using the function graph 902 corresponding to the high power mode.

According to various embodiments, the function graph 901 in the low power mode and the function graph 902 in the high power mode are generated before the IC (e.g., the source driver) is mounted on a module (e.g., a display device) and operates. In addition, since the function graph 901 in the low power mode and the function graph 902 in the high power mode may be the minimum power mode or the maximum power mode operating in the IC, when the IC is mounted on the actual module and operates, power consumed by the IC may be a value between a power value corresponding to the low power mode and a power value corresponding to the high power mode.

For example, when the IC (e.g., the source driver) is mounted on an actual module (e.g., a display module) and operates, a function graph to be actually applied may correspond to a shape such as 903. According to an embodiment, the correction value generating circuit 124 may generate a function graph of 903 based on the amount of power consumed when the IC is mounted on an actual module and operates, or generate a correction value for correction from the function graph of 901 or 902. For example, when the measured value of the temperature sensor is 'd120+α', the external or ambient temperature may be output or estimated as a value between 30° C. and 45° C. (for example, a value obtained by adding as much as a correction value at 30° C. or a value obtained by reducing as much as the correction value at 45° C.) based on the amount of power consumed in the IC. According to various embodiments, the correction value may be determined from the function graph 901 or 902 by interpolation, but is not limited thereto.

Figure 10:
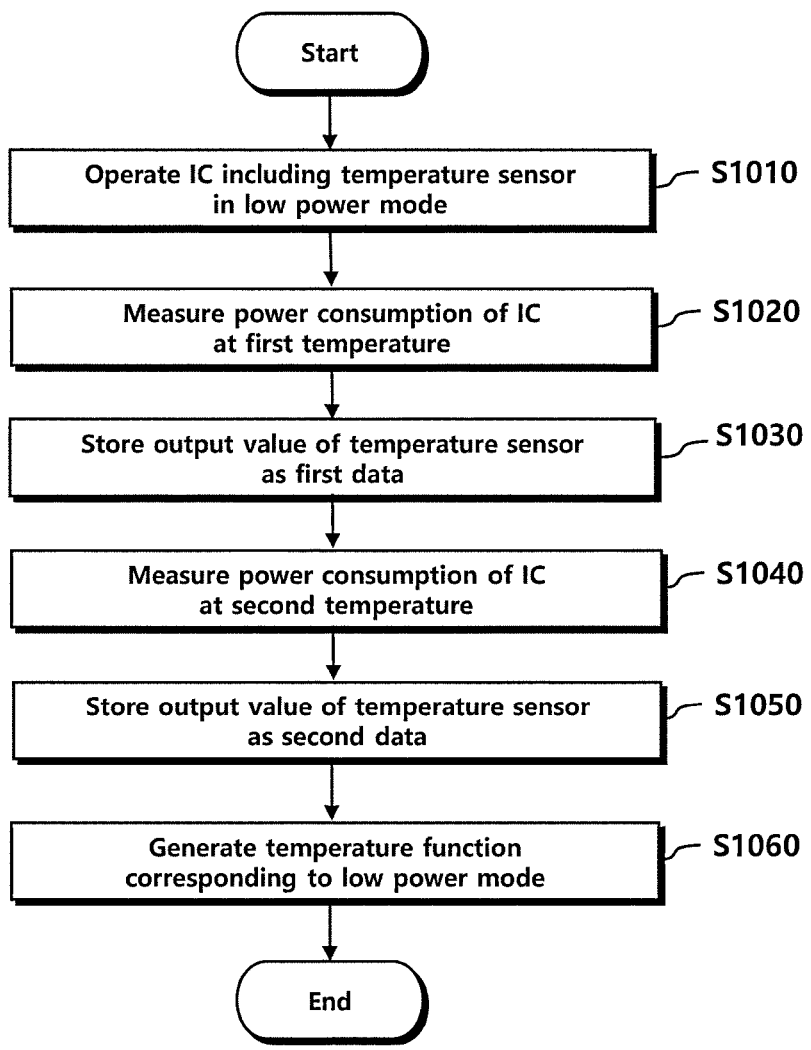
FIG. 10 is a flowchart illustrating a process of generating a temperature function according to an embodiment.

FIG. 10 is a flowchart illustrating a process of generating a temperature function (1000) according to an embodiment. Referring to FIG. 10, an IC including a temperature sensor may be operated in a low power mode (S1010). While the IC is operating in the low power mode, the ambient temperature of the IC may be maintained at a first temperature (30° C.) and power consumption of the IC may be measured (S1020). In the low power mode and in the state maintained at the first temperature, an output value from the temperature sensor may be stored as first data in a memory (S1030).

Next, while the IC operates in the low power mode, the ambient temperature of the IC may be maintained at a second temperature (e.g., 90° C.) and power consumption of the IC may be measured (S1040). In the low power mode and in the state maintained at the second temperature, an output value from the temperature sensor may be stored in the memory as second data (S1050). A temperature function may be generated (S1060). After that (S1060), when the IC operates in the low power mode, an external temperature or an ambient temperature may be accurately measured or estimated by applying an output value from the temperature sensor to the temperature function.

Figure 11:
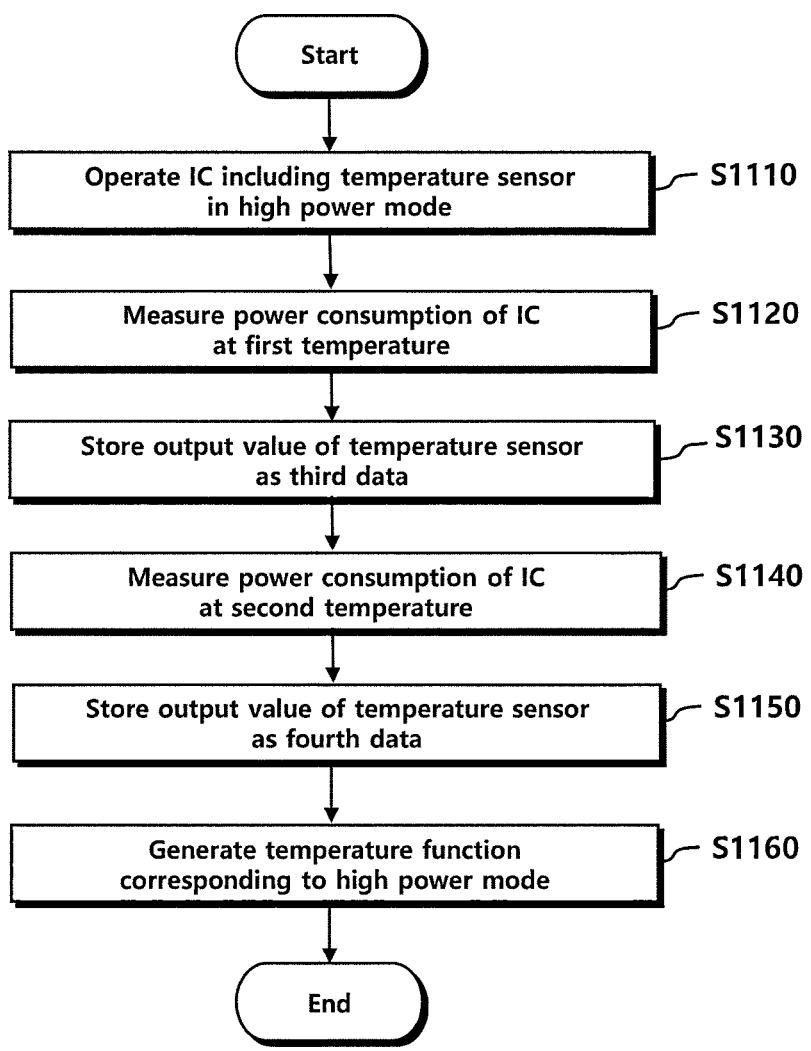
FIG. 11 is a flowchart illustrating a process of generating a temperature function according to an embodiment.

FIG. 11 is a flowchart illustrating a process of generating a temperature function (1100) according to an embodiment. Referring to FIG. 11, an IC including a temperature sensor may be operated in a high power mode (S1110). While the IC is operating in the high power mode, the ambient temperature of the IC may be maintained at a first temperature (e.g., 30° C.) and power consumption of the IC may be measured (S1120). In the high power mode and the state maintained at the first temperature, an output value of the sensor may be stored as third data in the memory (S1130).

Next, while the IC operates in the high power mode, power consumption of the IC may be measured in a state in which the ambient temperature of the IC is maintained at a second temperature (e.g., 90° C.) (S1140). In the high power mode and the state maintained at the second temperature, an output value from the temperature sensor may be stored as fourth data in the memory (S1150). A temperature function corresponding to the high power mode may be generated based on the third data and the fourth data stored in the memory (S1160). Thereafter, when the IC operates in the high power mode, an accurate external temperature or ambient temperature may be measured or estimated by applying the output value from the temperature sensor.

Figure 12:
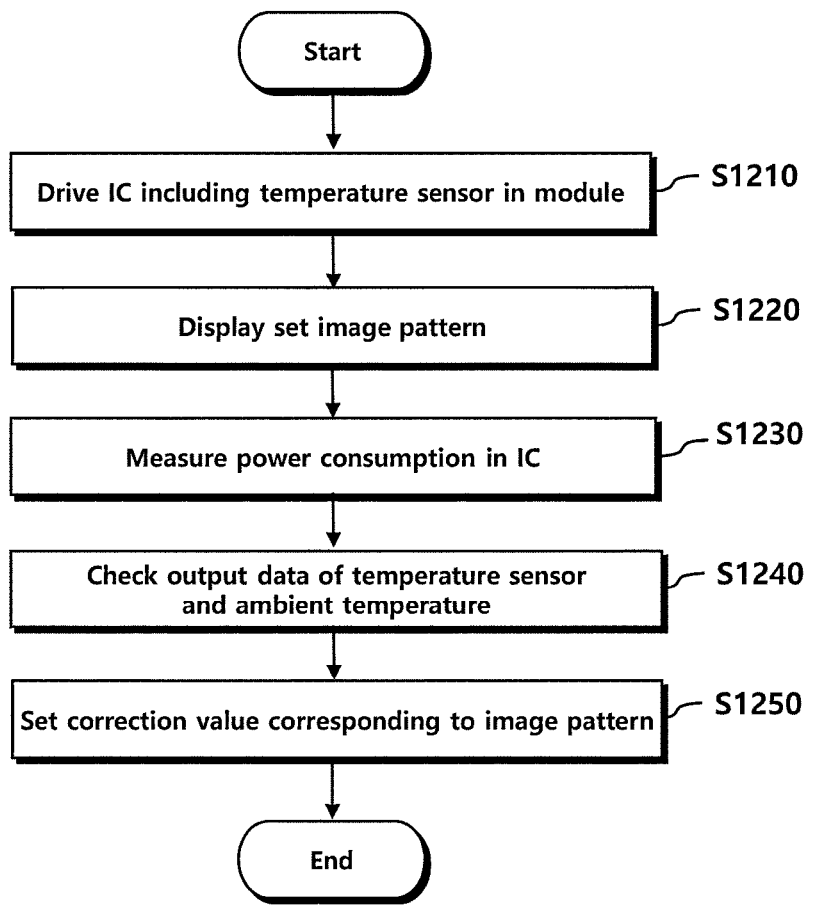
FIG. 12 is a flowchart illustrating a process of setting a correction value corresponding to an image pattern according to an embodiment.

FIG. 12 is a flowchart illustrating a process of setting a correction value corresponding to an image pattern (1200) according to an embodiment. Referring to FIG. 12, an IC (e.g., a source driver) including a temperature sensor may be driven in a module (e.g., a display device) (S1210). In the module equipped with the IC, the set image pattern may be displayed (S1220). When the image pattern is displayed, the IC may measure the amount of power consumed in the IC (S1230). The IC may check output data of the temperature sensor and the ambient temperature (S1240). The IC may set a correction value corresponding to the image pattern (S1250). According to another embodiment, the IC may measure the amount of power consumed in the IC based on a luminance or a color of a displayed image instead of a pattern of the displayed image in operation S1230. According to various embodiments, the IC may set a correction value corresponding to the measured amount of power of the IC to correspond to the image pattern. As another embodiment, the IC may measure the amount of power consumed in the IC based on a displayed application instead of the pattern of the displayed image in operation S1230.

Thereafter, when the IC intends to measure or estimate the external temperature or the ambient temperature, the IC may measure or estimate an accurate external temperature or ambient temperature by applying the set correction value corresponding to the amount of power consumed in the IC or the set correction value corresponding to the image pattern displayed in the panel to data output from the temperature sensor.

According to another embodiment, the IC may set a thermal resistance value of the temperature sensor based on the set correction value. For example, when the temperature sensor estimates the external temperature or the ambient temperature by applying the set thermal resistance to a sensed output value, an accurate external temperature or the ambient temperature may be measured or estimated by applying different thermal resistance values according to the displayed image pattern or the displayed application.

Figure 13:
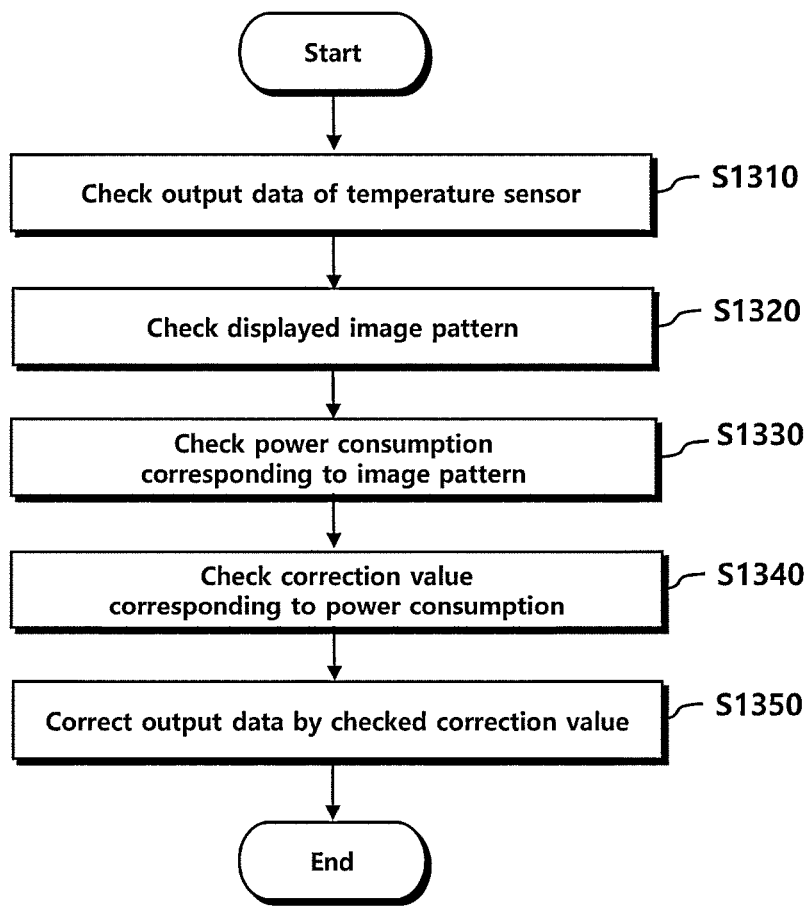
FIG. 13 is a flowchart illustrating a process of correcting output data according to an image pattern according to an embodiment.

FIG. 13 is a flowchart illustrating a process of correcting output data according to an image pattern (1300) according to an embodiment. Referring to FIG. 13, an IC including a temperature sensor may check output data output from the temperature sensor (S1310). The IC may be mounted on a module (e.g., a display device) to provide a data voltage to a panel to display an image. The IC may check an image pattern displayed through a panel (S1320). The IC may check the amount of power corresponding to the checked image pattern (S1330). The IC may check a set correction value to correspond to the amount of consumed power (S1340). The IC may measure or estimate an accurate external temperature or ambient temperature by correcting output data of the temperature sensor using the checked correction value (S1350).

What is claimed is:
1. A method for measuring a temperature, the method comprising:
  sensing a signal corresponding to a temperature by a temperature sensor included in an integrated circuit (IC);
  identifying an amount of power consumed according to an operation of the IC;
  generating a correction value corresponding to the identified amount of power; and
  generating an estimate value of an ambient temperature based on the correction value and the signal sensed by the temperature sensor,
  wherein a thermal resistance value of the temperature sensor is configured to be set based on a first amount of power consumed according to the operation of the IC and a first correction value corresponding to the first amount of power.

2. The method of claim 1, wherein the amount of power is identified based on an image pattern of an image displayed by using the IC.

3. The method of claim 1, wherein the amount of power is identified based on a luminance or a color of an image displayed by using the IC.

4. The method of claim 1, wherein the signal corresponding to the temperature is a voltage signal or a current signal.

5. The method of claim 1, further comprising:
  when a data voltage corresponding to a first image pattern is output by using the IC, storing the first amount of power consumed according to the operation of the IC and the first correction value corresponding to the first amount of power in a memory.

6. The method of claim 5, further comprising:
  generating the estimate value of the ambient temperature based on the first amount of power and the first correction value.

7. An integrated circuit (IC) comprising:
  a temperature sensor configured to sense a signal corresponding to a temperature;
  a correction value generating circuit configured to identify an amount of power consumed according to an operation of the IC and generate a correction value corresponding to the amount of power; and
  a data correction circuit configured to generate an estimate value of an ambient temperature based on the correction value generated by the correction value generating circuit and the signal sensed by the temperature sensor
  wherein the correction value generating circuit is configured to set a thermal resistance value of the temperature sensor based on a first amount of power consumed according to the operation of the IC and the first correction value corresponding to the first amount of power.

8. The IC of claim 7, wherein the correction value generating circuit is configured to identify the amount of power based on an image displayed by using the IC.

9. The IC of claim 8, wherein the correction value generating circuit is configured to identify the amount of power based on an image pattern of the image displayed by using the IC.

10. The IC of claim 8, wherein the correction value generating circuit is configured to identify the amount of power based on a luminance or a color of the image displayed by using the IC.

11. The IC of claim 7, further comprising:
  a memory configured to store, as first data, an output value from the temperature sensor when the IC operates in a first mode in which the first amount of power is consumed and to store, as second data, an output value from the temperature sensor when the IC operates in a second mode in which a second amount of power is consumed.

12. The IC of claim 11, wherein the correction value generating circuit is configured to generate the correction value based on the first data and the second data.

13. The IC of claim 11, wherein when outputting a data voltage corresponding to a first image pattern by using the IC, the memory is configured to store a the first amount of power consumed according to the operation of the IC and the first correction value corresponding to the first amount of power.

14. The IC of claim 13, wherein the data correction circuit is configured to generate an estimate value of the ambient temperature based on the first amount of power and the first correction value.

15. A display device comprising:
a data driving circuit configured to generate a data voltage corresponding to a grayscale value of each pixel; and
a panel including a plurality of pixels arranged therein and causing the plurality of pixels to emit light based on the data voltage received from the data driving circuit,
wherein the data driving circuit includes:
  a temperature sensor configured to sense a signal corresponding to a temperature;
  a correction value generating circuit configured to identify an amount of power consumed according to an operation of the data driving circuit and to generate a correction value corresponding to the amount of power; and
  a data correction circuit configured to generate an estimate value of an ambient temperature based on the correction value generated by the correction value generating circuit and the signal sensed by the temperature sensor
wherein the correction value generating circuit is configured to set a thermal resistance value of the temperature sensor based on a first amount of power consumed according to the operation of an integrated circuit (IC) and a first correction value corresponding to the first amount of power.

16. The display device of claim 15, wherein the correction value generating circuit is configured to identify the amount of power based on an image pattern of an image displayed by using the data driving circuit.

17. The display device of claim 15, wherein the correction value generating circuit is configured to identify the amount of power based on a luminance or a color of an image displayed by using the data driving circuit.

18. The display device of claim 15, further comprising:
a memory configured to map and to store the first amount of power consumed according to an operation of the data driving circuit and the first correction value corresponding to the first amount of power, when outputting a data voltage corresponding to a first image pattern using the data driving circuit.

* * * * *